United States Patent [19]
Hirohashi et al.

[11] Patent Number: 5,926,302
[45] Date of Patent: Jul. 20, 1999

[54] BI-DIRECTIONAL OPTICAL WIRELESS COMMUNICATION APPARATUS AND METHOD OF BI-DIRECTIONAL OPTICAL WIRELESS COMMUNICATION

[75] Inventors: Kazutoshi Hirohashi, Yokohama; Atsushi Sakamoto, Tokyo; Manabu Sakane, Yokosuka, all of Japan

[73] Assignee: Victor Company of Japan, Ltd., Yokohama, Japan

[21] Appl. No.: 08/665,361

[22] Filed: Jun. 17, 1996

[30] Foreign Application Priority Data

Jun. 16, 1995 [JP] Japan .................................. 7-174079

[51] Int. Cl.$^6$ ...................................... H04J 14/02
[52] U.S. Cl. .......................... 359/161; 359/132; 359/158; 359/143
[58] Field of Search ..................... 359/152, 172, 359/174, 175, 161, 169, 170, 124, 132, 158, 143; 250/214 B

[56] References Cited

U.S. PATENT DOCUMENTS

| 5,075,792 | 12/1991 | Brown et al. | 359/152 |
| 5,349,463 | 9/1994 | Hirohashi et al. | 359/174 |
| 5,600,471 | 2/1997 | Hirohashi et al. | 359/152 |

FOREIGN PATENT DOCUMENTS

| 498914 | 3/1992 | Japan . |
| 6224858 | 8/1994 | Japan . |
| 7297788 | 11/1995 | Japan . |
| 856198 | 2/1996 | Japan . |

*Primary Examiner*—Leslie Pascal
*Attorney, Agent, or Firm*—Lowe Hauptman Gopstein Gilman & Berner

[57] ABSTRACT

A bi-directional optical wireless communication apparatus comprises a modulator outputting a narrow band signal whose center frequency is selected from N center frequencies, an optical transmitter transmitting an optical signal from the narrow band signal, an optical receiver for receiving N optical signals, N receiving circuits corresponding to the N center frequencies, a cancelling circuit for cancelling the optical signal received by the optical receiver via reflective object in received N optical signals using the narrow band signal in accordance with a magnitude of the optical signal received by the optical receiver, a frequency discriminator discriminating frequencies of the received N optical signals, and a control circuit. The frequency discriminator discriminates for an interval that the optical transmitter does not transmit the optical signal. Then, the modulating circuit continuously outputs a received signal from one of N receiving circuits corresponding to the discriminated frequency and the modulator modulates the narrow band signal to have a center frequency other than the discriminated frequency under control of the control circuit. The interval is repeated with a repetition randomly set interval.

8 Claims, 7 Drawing Sheets

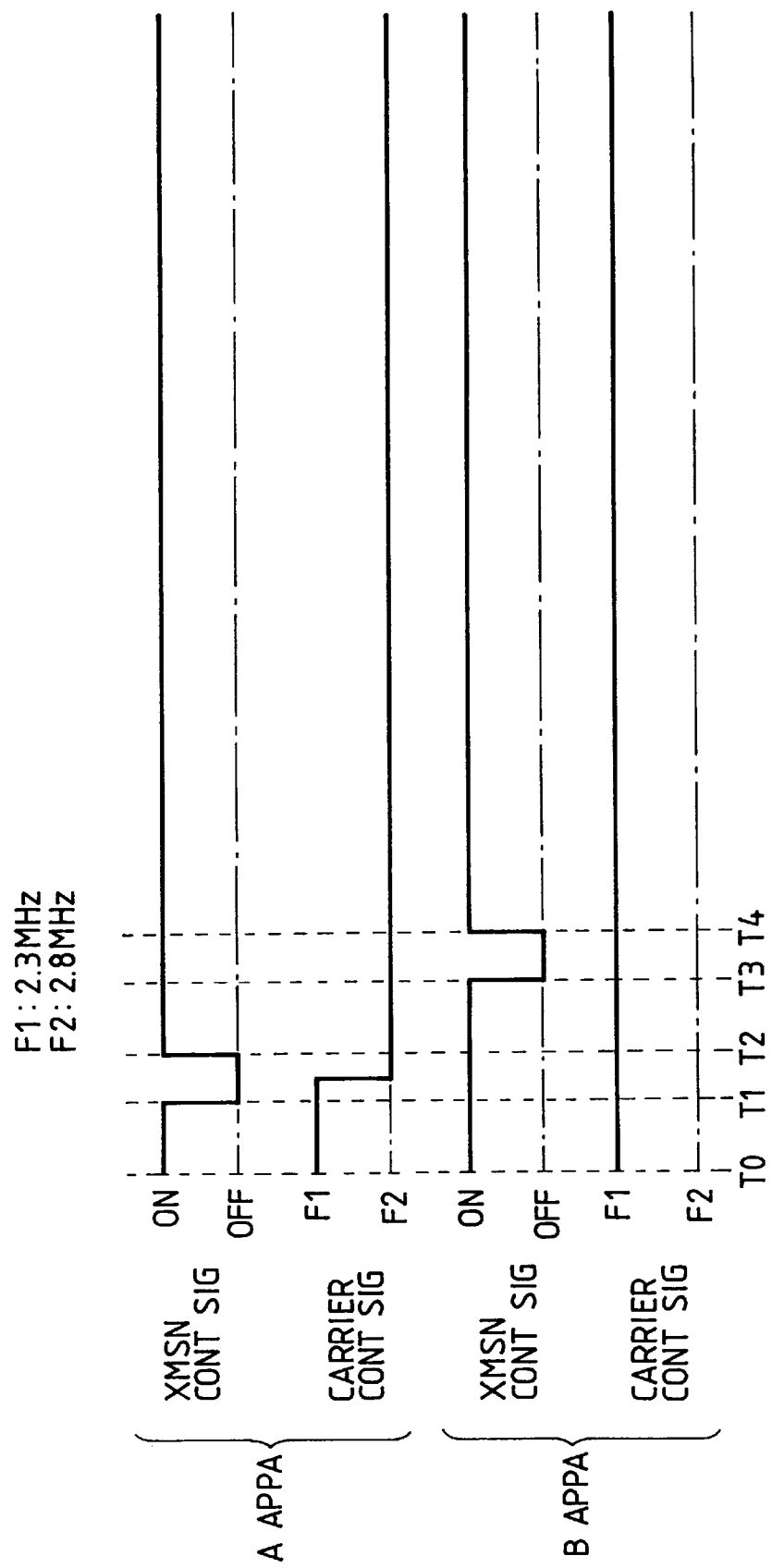

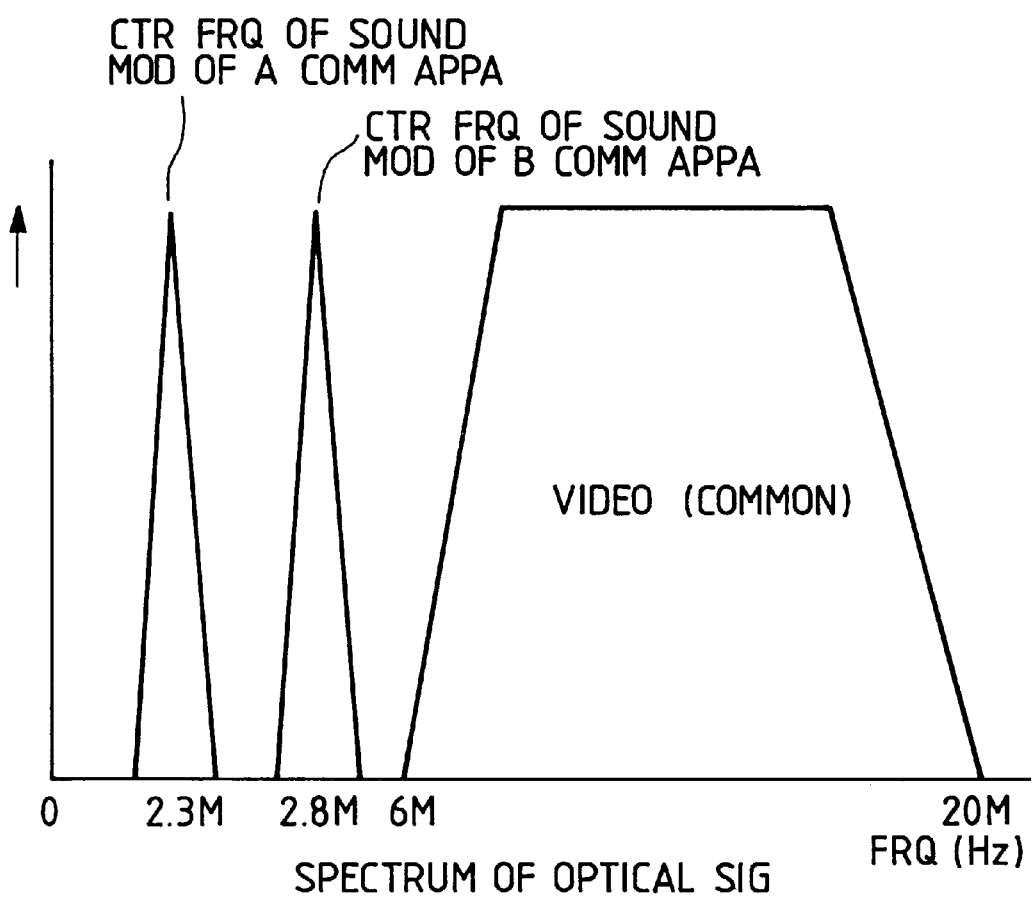

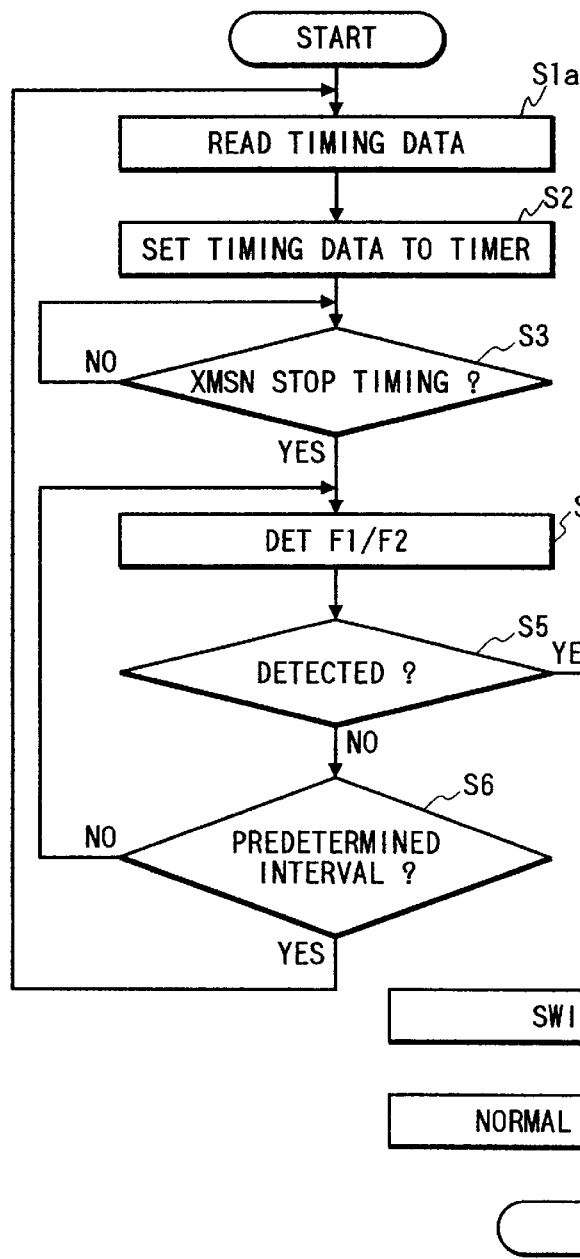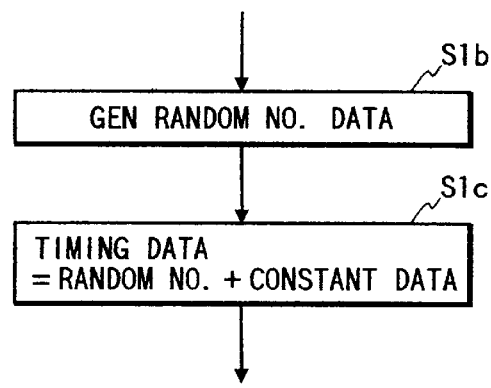
FIG. 7A
FIG. 7B

BI-DIRECTIONAL OPTICAL WIRELESS COMMUNICATION APPARATUS AND METHOD OF BI-DIRECTIONAL OPTICAL WIRELESS COMMUNICATION

BACKGROUND OF THE INVENTION

1. Field of the Invention

This invention relates to a bi-directional optical wireless communication apparatus and a method of bi-directional optical wireless communication.

2. Description of the Prior Art

A bi-directional optical wireless communication apparatus communicating with another bi-directional optical wireless communication apparatus is known.

A prior art bi-directional optical communication apparatus is disclosed in Japanese patent application No. 6-209080 by the same inventor of this invention.

In this prior art bi-directional optical communication apparatus transmits a first broad band signal and a first narrow band signal superimposed each other and receives the reflected first broad band signal and the reflected first narrow band signal in addition to a second broad band signal, having the same broad band, and a second narrow band signal having a different narrow band transmitted from another bi-directional optical apparatus and cancels the reflected first broad band signal to detect the second broad band signal in accordance with a control signal indicative of excess or insufficiency of a cancelling amount which is generated through phase comparing the first narrow band signal with the reflected first narrow band signal.

FIG. 5 is a block diagram of this prior art bi-directional optical communication apparatus. FIG. 6 is a graphical drawing of a spectrum representing bands of optical signals used in this prior art bi-directional optical communication apparatus.

A video input signal is modulated by a video FM modulation circuit 1 and the sound input signal is modulated by a sound FM modulation circuit 2. Both modulation signals are added by an adding circuit 3. An output of the adding circuit 3 is transmitted by an emitting element 5 such as an LED through a driver 4 as an optical output signal.

On the other hand, the receiving element 6 receives optical signals and generates a received signal in cooperation with a receiving circuit 7. The received signal is amplified by an amplifier 9 via an adding circuit 8 and applied to a band pass filter (BPF) 10 for a video signal, a band pass filter 11 for a sound signal, and a band pass filter 12 for a sound signal transmitted by this bi-directional communication apparatus. The band pass filter 10 transmits a frequency band of the video signal and the band pass filter 11 transmits a transmitted signal having a sound frequency band. Outputs of the band pass filters 10 and 11 are supplied to modulation circuits 13 and 14 for the video signal and the sound signal respectively. The modulation circuit 13 and 14 output a video output signal and a sound output signal respectively.

As shown in FIG. 6, the transmitted and received video signals have the same band from 6–20 MHz because the emitting element 5 such as the LED has a frequency response up to 20 to 30 MHz, the video signal has a broad band at least 0 to 5 MHz which varies with an modulation index, and there is interference light components up to 1 MHz. On the other hand, the sound signals are transmitted through different bands in respective directions. Then, receiving the video signal requires cancellation of the video signal transmitted by this bi-directional communication apparatus which is reflected by a reflective object. The adder 8 cancels the reflected video and sound signals which are transmitted by this bi-directional communication apparatus in the received signal by the receiving element 6 with the video signal and sound signal from the adder 3. However, an excessive cancellation provides an inverted component of the video signal and the sound signal from the adder 3 at the output of the adder 8. On the other hand, an insufficient cancellation leaves the reflected video and sound signals at the output of the adder 8. A necessary degree of the cancellation is detected by phase comparing the sound modulation signal from the modulator 2 with an output of the band-pass filter 12 extracting the reflected sound signal, by a phase comparator 17. Therefore, an output of the phase comparator 17 represents the excessive and insufficient condition of the cancellation. A low pass filter 18 smooths an output of the phase comparator 17. Then, a voltage controlled amplifier adjusts the degree of cancellation. When the amplitude of the voltage controlled amplifier 15 equals to that of the received reflected optical signal, the reflected optical signal including the video signal and the sound signal transmitted from this bi-directional communication apparatus is preferably suppressed. The output of the voltage controlled amplifier 15 is phase compensated by a phase compensation circuit 16 and supplied to a minus input of the adder 8.

SUMMARY OF THE INVENTION

The aim of the present invention is to provide an improved bi-directional optical wireless communication apparatus and an improved method of bi-directional optical wireless communication.

According to the present invention a bi-directional optical wireless communication apparatus is provided, which comprises: a modulation circuit for modulating an input signal and outputting a narrow band signal having a center frequency selected from N different center frequencies, N being a natural number more than one; an optical transmission circuit responsive to the narrow band signal for transmitting an optical signal; an optical receiving circuit for receiving N optical transmission signals having the N different center frequencies; N receiving circuits responsive to the optical receiving circuit for selectively receiving the N optical transmission signals from the optical receiving circuit respectively; a first detection circuit responsive to the optical receiving circuit for detecting one of the N optical transmission signals having the center frequency; a second detection circuit for detecting a magnitude of the detected one of the N optical signals; a suppressing circuit for suppressing one of the N optical transmission signals having the center frequency included in the N optical transmission signals from the optical receiving circuit using the narrow band signal in accordance with the detected magnitude; a frequency discrimination circuit responsive to the optical receiving circuit for discriminating each frequency of at least one of received N transmission signals when the optical transmission circuit does not transmit the optical signal; and a control circuit for selecting at least one of the N receiving circuits which corresponds to the discriminated each frequency to supply at least an output signal from the selected at least one of the N receiving circuits and for operating the modulation circuit to select one of the N different center frequencies other than the discriminated frequency to continuously transmit the optical signal, the optical signal being reflected by a reflective object and detected as one N optical transmission signals having the center frequency via the optical receiving circuit.

This bi-directional optical wireless communication apparatus may further comprise: a power on detection circuit for detecting a power on of the same; a second control circuit for controlling the optical transmission circuit to stop transmitting the optical signal for a predetermined interval at a predetermined timing from the detected power on and for controlling the frequency discriminating circuit to discriminate the frequency of one of received N transmission signals for the predetermined interval. In this case, the second control circuit may control the optical transmission circuit to stop transmitting the optical signal repeatedly with a repetition interval and this apparatus further comprises a third control circuit for making the repetition interval random every repetition.

This bi-directional optical wireless communication apparatus may further comprise a band pass filter circuit for selectively supplying the received N transmission signals from the optical receiving circuit to the frequency discrimination circuit.

According to this invention a method of bi-directional optical wireless communication is provided, which comprises the steps of: providing a modulation circuit for modulating an input signal to a narrow band signal having a center frequency which is selected from N different center frequencies, N being a natural number more than one; providing an optical transmitter for transmitting an optical signal from the narrow band signal; providing an optical receiver for receiving N optical transmission signals having the N different center frequencies, the N optical transmission signals including the optical signal reflected by a reflective object; providing N receiving circuits responsive to the optical receiver for selectively receiving the N transmission signals respectively; providing a first detector responsive to the optical receiver for detecting one of the N optical transmission signals having the center frequency; providing a second detector for detecting an magnitude of one of the N optical transmission signals having the center frequency; providing a suppressing circuit for suppressing one of the N optical transmission signals having the center frequency included in the N optical transmission signals from the optical receiver using the narrow band signal in accordance with the detected magnitude; providing a frequency discriminating circuit responsive to the optical receiver for discriminating each frequency of at least one of received N transmission signals; detecting a power on; controlling the optical transmitter to stop transmitting the optical signal for a predetermined interval at a predetermined timing from the detected power on; controlling the frequency discriminating circuit to discriminate the each frequency for the predetermined interval; and effecting a continues communication by: selecting one of the N receiving circuits which corresponds to the discriminated each frequency to supply at least an output signal from the selected one of the N receiving circuits; and operating the modulation circuit to select one of the N different center frequencies which is different from the discriminated frequency.

This method may further comprises the steps of: controlling the optical transmission circuit to stop transmitting the optical signal for the predetermined interval repeatedly with a repetition interval; and controlling the repetition interval to be random.

BRIEF DESCRIPTION OF THE DRAWINGS

The object and features of the present invention will become more readily apparent from the following detailed description taken in conjunction with the accompanying drawings in which:

FIG. 3 is a graphical drawing of a timing chart of this embodiment;

FIG. 6 is a graphical drawing of spectrum representing bands of optical signals used in this prior art bi-directional optical communication apparatus;

FIG. 7A is a diagram of a flow chart of this embodiment; and

FIG. 7B is a diagram of a step of the modification.

The same or corresponding elements or parts are designated with like references throughout the drawings.

DETAILED DESCRIPTION OF THE INVENTION

Hereinbelow will be described an embodiment of this invention.

Figure 1:
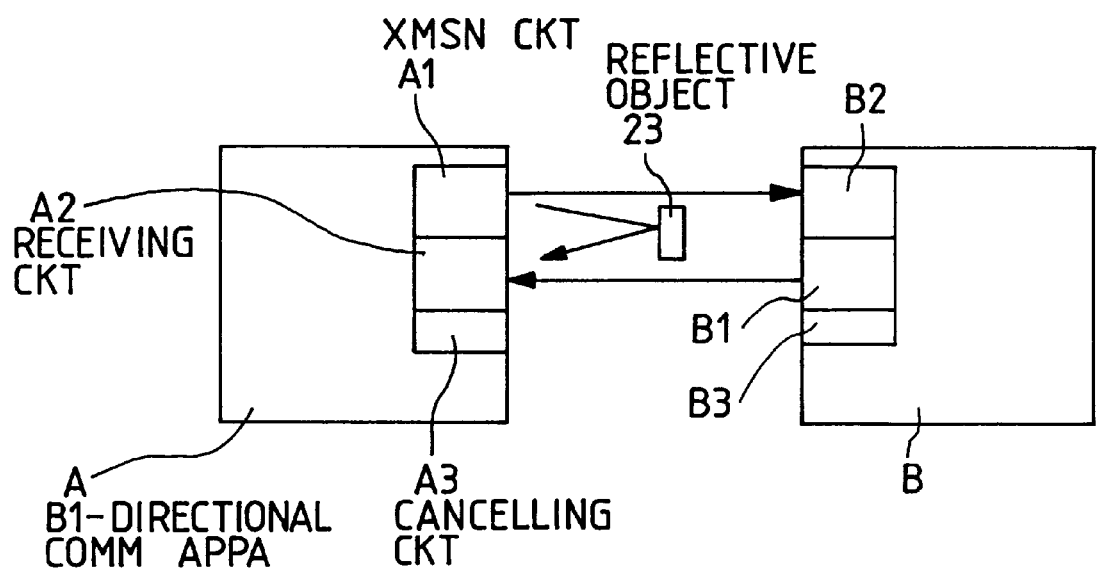
FIG. 1 is an illustration of a pair of bi-directional communication apparatus coupled each other of an embodiment of this invention.
Figure 2A:
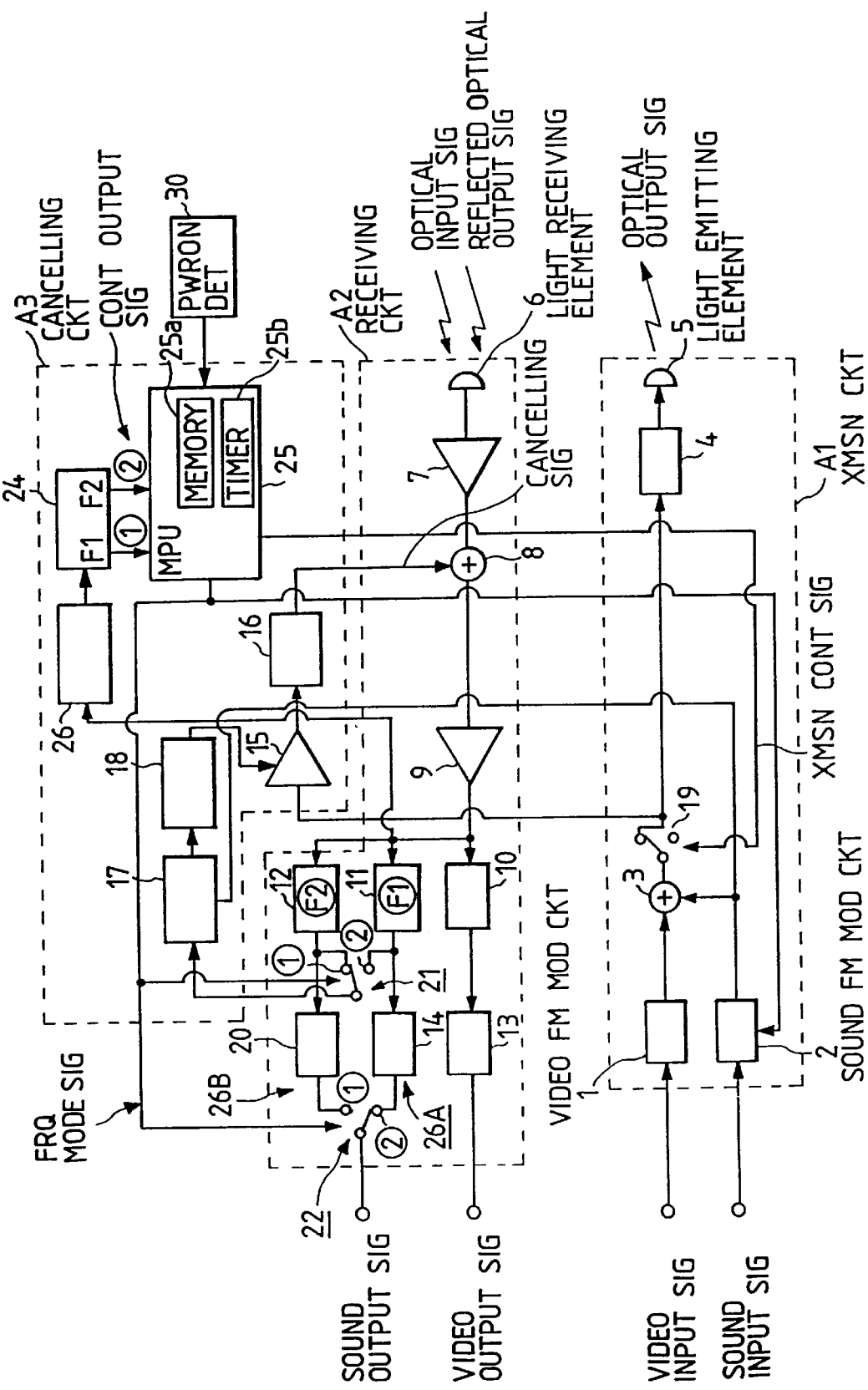
FIG. 2 is a block diagram of the bi-directional communication apparatus of this embodiment.

FIG. 1 is an illustration of a pair of bi-directional communication apparatus of this embodiment which are coupled to each other. FIG. 2 is a block diagram of the bi-directional communication apparatus of this embodiment. FIG. 3 is a graphical drawing of a timing chart of this embodiment.

In this embodiment, the bi-directional optical wireless communication apparatus transmits and receives video and sound signals bi-directionally through the air.

As shown in FIG. 1, a pair of the bi-directional optical wireless communication apparatus A and B communicate with each other. They comprise transmission circuits A1 and B1, receiving circuits A2 and B2, and cancelling circuits A3 and B3 respectively. To optically couple both bi-directional optical wireless communication apparatus A and B, both apparatus are so arranged that apparatus A and B confront each other. In this embodiment, both apparatus are arranged relatively close to each other. For example, both apparatus communicate at a distance of one meter or less.

In each of apparatus A and B, a sound signal and a video signal are frequency modulated and added, and then, the resulting added signal is transmitted. Since both apparatus A and B have the same structure, a description is made only of apparatus A.

The transmission signal (optical output signal) has a spectrum as shown in FIG. 6 for example, wherein, a frequency component of the video signal ranges from 6 MHz to 20 MHz which is used bi-directionally or common, that is, a frequency band of the video signals between the apparatus A and B is common. On the other hand, in this invention, frequency bands (center frequency) of the sound signals are selected for transmission and reception respectively, wherein frequency bands are different between transmission and receiving in each of apparatus A and B.

The transmission circuit A1 comprises a video frequency modulation circuit 1 for frequency modulating a video input signal, a sound frequency modulation circuit 2 for frequency modulating a sound input signal, an adder 3 for adding an output of the sound frequency modulation circuit 2 to an output of the video frequency modulation circuit 1, a switch 19 for selectively outputting an output of the adder 3 in response to a transmission control signal, a light emitting element 5, such as an LED, for emitting optical output signal, an LED driver 4 for driving a light emitting element 5 in accordance with the signal from the switch 19.

The sound frequency modulation circuit 2 selectively generates two carriers having different frequencies and one carrier is selected and used to modulated the sound input signal. For example, the sound input signal is modulated to have a narrow band modulation signal having a center frequency 2.3 MHz or 2.8 MHz. The switch 19 outputs the output of the adder 3 and cuts off in accordance with the transmission control signal supplied thereto.

The receiving circuit A2 comprises a receiving element 6, such as a photodiode, for receiving an optical input signal from the apparatus B corresponding to this apparatus A, a conversion circuit 7 for converting a current signal from the light receiving element 6 into a voltage signal, an adder 8 for adding a cancelling signal (mentioned later) to an output of the conversion circuit 7, an amplifier 9 for amplifying an output of the adder 8, a video band pass filter 10 for extracting a video signal from an output of the amplifier 9, a video signal demodulator 13, a first sound signal band pass filter 11 for extracting a first sound signal from the output of the amplifier 9, a second sound signal band pass filter 12 for extracting a second sound signal from the output of the amplifier 9, first and second sound signal demodulation circuits 14 and 20 for demodulating first and second sound signals respectively, a switch 21 for outputting either of an output of the first sound signal band pass filter 11 or an output of the second sound signal band pass filter 12, and a switch 22 for outputting either of an output of the first sound signal demodulation circuit 14 or an output of the second sound signal demodulation circuit 20. The first sound signal band pass filter 11 extracts a first sound signal having the center frequency of 2.3 MHz (F1) and the first sound signal demodulation circuit 14 demodulates with respect to the center frequency of 2.3 MHz. On the other hand, the second sound signal band pass filter 12 extracts the second sound signal having the center frequency of 2.8 MHz (F2) and the second sound signal demodulation circuit 20 demodulates with respect to the center frequency of 2.8 MHz.

The first sound signal band pass filter 11 and the first sound signal demodulation circuit 14 form a first receiving portion 26A and the second sound signal band pass filter 12 and the second sound signal demodulation circuit 20 form a second receiving portion 26B. The switch 21 outputs either of the output of the first sound signal band pass filter 11 or the output of the second sound signal band pass filter 12, and the switch 22 outputs either of the output of the first sound signal demodulation circuit 14 or the output of the second sound signal demodulation circuit 20 in response to a frequency mode signal. When the sound signal modulation circuit 2 modulates the sound input signal having the center frequency F1, the switch 21 outputs the output of the sound signal band pass filter 11 for outputting the frequency component of the center frequency F1. On the other hand, in this condition, the switch 22 outputs the sound demodulated signal from the sound signal demodulator 20 for demodulating the sound signal having the center frequency F2 transmitted from the apparatus B. When the center frequency of the sound signal frequency modulation circuit 2 is changed, these switches 21 and 22 are turned over synchronously in response to the frequency mode signal indicative of the modulation frequency.

The output of the adder 3 in the transmission circuit A1 is applied to the light emitting element 5 through the driver 4 and emits the optical output signal with a radiation angle of about 60 degrees.

The apparatus A receives the optical input signal during transmission. The light receiving element 6 has a field of angle of receiving the optical input signal of about 60 degrees similarly. Therefore, it is allowed that the both apparatus A and B are arranged with a deviation angle up to 60 degrees therebetween.

When there is no reflective object between the apparatus A and B, a high quality reception is possible because the apparatus A receives the optical signal from only the apparatus B. However, if there is a reflective object 23 as shown in FIG. 1, the apparatus A receives the optical output signal emitted from the apparatus A and reflected by the reflective object 23 in addition to the optical input signal from the apparatus B. The cancelling circuit A3 suppresses the optical output signal emitted from this apparatus A and reflected by the reflective object 23 in the mixedly received optical signals to keep the quality of the reception of the sound signal and the video signal.

Cancelling the received optical output signal from this apparatus A can be performed by adding the modulation signal to the received signal having an inverse phase relation therebetween. That is, the modulation signal to be added is made to have the same amplitude of the received optical output signal from this apparatus via the reflective object 23 but to have an anti-phase relation therebetween. Therefore, the video demodulation circuit 13 can demodulates the video signal from only the apparatus B with the video signal from this apparatus A suppressed.

The cancelling circuit A3 comprises a phase comparator 17 for phase comparing either of the outputs of the first or second sound signal band pass filters 11 or 12 supplied through the switch 21 with the sound signal to be transmitted from this apparatus A, a low pass filter 18 for low pass filtering an output of the phase comparator 17, a voltage controlled amplifier 15 for amplifying an output of the added signal from the adder 3 via the switch 19 in accordance with an output of the low pass filter 18, a delay circuit 16 for delaying an output of the voltage controlled amplifier 15 to adjust a phase of the output of the voltage controlled amplifier 15 by a predetermined interval.

The cancelling circuit A3 further comprises a band pass filter 26 for extracting two narrow band modulation signals having the center frequencies F1 and F2 from the output of the amplifier 9, a frequency discriminating circuit 24 for discriminating a center frequency of the output signal of the amplifier 9 between the center frequencies F1 and F2, and a microprocessor 25 responsive to outputs of the frequency discriminating circuit 24 for generating the transmission control signal to the switch 19 and the frequency mode signal supplied to the switches 21 and 22.

The phase comparator 17 compares a phase of the output of the switch 21 with a phase of the output of the sound signal frequency modulation circuit 2 and outputs a signal having a polarity inverted between excess and insufficiency in an amount of cancelling. The low pass filter 18 smooths the output of the phase comparator 17. The smoothed signal is supplied to the voltage controlled amplifier 15. Therefore, the voltage controlled amplifier 15 changes a gain thereof in accordance with the smoothed signal to keep the amount of cancelling suitable.

In this embodiment, because the apparatus A and B have the same structure and the sound modulation signals are transmitted at the same time with frequency division, the carrier frequencies of the sound modulation signals of the apparatus A and B should be made different each other. Then, the frequency discriminating circuit 24 is provided for discriminating the frequency band of the sound signal (narrow band signal) from the partner apparatus B. The microprocessor 25 changes the switches 19, 21, and 22 and changes a carrier frequency of the sound frequency modulation circuit 2 in response to the outputs of the frequency discriminating circuit 24. That is, the microprocessor 25 operates the switch 22 to select one of the outputs of the receiving portions 26A and 26B having the same frequency band as the frequency band discriminated by the frequency discriminating circuit 24. Moreover, the microprocessor 25 operates the sound frequency modulation circuit 2 to select one of carrier frequency different from the frequency discriminated by the frequency discriminating circuit 24. During the frequency discrimination, the microprocessor 25 stops transmitting the optical output signal at a timing from a start-up of this apparatus A for a predetermined interval, then, receives the sound signal from the partner apparatus B, discriminates the frequency of the sound signal, and then changes the switches 19, 21, 22 and changes the carrier frequency in the sound frequency modulation circuit 2, and holds this condition. The microprocessor 25 executes this operation in accordance with a predetermined program stored in a memory 25 therein in response to a power-on detector 30.

The operation will be described more specifically.

The microprocessor 25 executes the predetermined programs as shown by the timing chart in FIG. 3 to automatically select the carrier frequency for modulation and the band pass filters 11 and 12 and the demodulation circuits 14 and 20.

When the apparatus A and B confronting each other is turned on at a timing T0, the microprocessor 25 executes an initializing operation to make the outputs thereof to H, so that the switch 21 is turned to a side ② and the switch 22 is turned to a side ①, and the frequency modulation circuit 2 selects the carrier of the frequency F1 (2.3 MHz). Therefore, carriers of both apparatus A and B are set to the frequency F1 and the receiving portion is set to receive the sound modulation signal having a center frequency F2 (2.8 MHz).

In this condition, because the apparatus A and B have the same structure and the sound modulation signals are transmitted at the same time with the same frequency division, the communication between both apparatus A and B and the cancellation cannot be provided. That is, the carrier frequencies of the sound modulation signal of the apparatus A and B should be made different from each other. This operation will be described.

Each of the microprocessors 25 of the apparatus A and B has a timer 25b. However, each of the microprocessors 25 stores a different timing data in the memory 25a to generate the transmission control signals at a different timing from the start-up timing as shown in FIG. 3.

After a predetermined interval has passed from the start-up, the microprocessor 25 of the apparatus A makes the transmission control signal attain a value L to stop transmission of the optical output signal from a timing T1 to a timing T2. On the other hand, the microprocessor 25 of the apparatus B makes the transmission control signal attain a value L to stop transmission of the optical output signal from a timing T3 to a timing T4. While the transmission is stopped, there is no reflected optical signal from this apparatus A and the cancelling signal from the delay 16 is not supplied to the adder 8, so that the optical signal from the partner apparatus B can be received without interference. The received optical input signal is amplified by the amplifier 9 and supplied to the frequency discriminating circuit 24 through the low pass filter 26 where video signal is suppressed.

As mentioned, the apparatus A enters the transmission stop condition from T1 to T2 first. During this, the microprocessor 25 of the apparatus A receives the result of the frequency discrimination circuit 24 to detect the carrier frequency F1 transmitted from the apparatus B. When the frequency discrimination circuit 24 detects the carrier frequency F1, the frequency discrimination circuit 24 outputs a discrimination signal of F1. In response to this, the microprocessor 25 of the apparatus 25 changes over the switch 19 to a transmission condition and holds this condition. Moreover, the microprocessor 25 of the apparatus A supplies the frequency mode signal to the sound signal frequency modulation circuit 2 to select the carrier frequency F2 (2.8 MHz) to differentiate the carrier frequency of this apparatus A from the carrier frequency F1 of the apparatus B. The frequency mode signal is also supplied to the switches 21 and 22, so that the switch 21 is turned to the side ① and the switch 22 is turned to the side ②. Therefore, the sound output signal is outputted from the receiving portion 26A and this condition is held. The signal to the phase comparator 17 is supplied from the band pass filter 12 extracting the narrow band signal having the center frequency F2 which is the same as the carrier frequency of the sound frequency modulation circuit 2. Then, the apparatus A is set to the frequency mode of F2, that is, the carrier frequency is set to F2. On the other hand, the apparatus B is set to the frequency mode of F1, that is, the carrier frequency is set to F1.

On the other hand, the apparatus B enters the transmission stop condition from T3 to T4. During this period, the microprocessor 25 of the apparatus B receives the optical input signal with carrier frequency F2 from the apparatus B without interference.

The cpu 25 of the apparatus B receives the result of the frequency discrimination circuit 24 indicative of the carrier frequency F2 transmitted from the apparatus A. When the frequency discrimination circuit 24 detects the carrier frequency F2, the frequency discrimination circuit 24 outputs a discrimination signal of F2. In response to this, the microprocessor 25 of the apparatus B changes over the switch 19 to a transmission condition and holds this condition. Moreover, the microprocessor 25 of the apparatus B supplies the frequency mode signal to the sound signal frequency modulation circuit 2 to select the carrier frequency F1 (2.3 MHz) to differentiate the carrier frequency of this apparatus B from the carrier frequency F2 of the apparatus A. The frequency mode signal is also supplied to the switches 21 and 22, so that the switch 21 is turned to the side ② and the switch 22 is turned to the side ①. Therefore, the sound output signal is outputted from the receiving portion 26B and this condition is held. The signal to the phase comparator 17 is supplied from the band pass filter 11 extracting the narrow band signal having the center frequency F1 which is the same as the carrier frequency of the sound frequency modulation circuit 2 of the apparatus B. Then, finally, the apparatus A is set to the frequency mode of F2, that is, the carrier frequency is set to F2 and the apparatus B is set to the frequency mode of F1, that is, the carrier frequency is set to F1.

In this condition, the apparatus A receives the sound signal having the carrier signal F1 from the apparatus B and the apparatus B receives the sound signal having the carrier signal F2 from the apparatus A. Moreover, the apparatus A receives the video signal from the apparatus B with the reflected optical output signal transmitted from the apparatus A favorably suppressed and the apparatus B receives the video signal from the apparatus A having the same frequency band as the video signal from the apparatus B with the reflected optical output signal transmitted from the apparatus B favorably suppressed. Therefore, the sound signals are transmitted bi-directionally through frequency division and video signals are transmitted through the signal suppression structure as mentioned. Then, both apparatus enter a normal transmission condition transmitting sound signals and video signals bi-directionally.

FIG. 7A is a diagram of a flow chart of this embodiment. The microprocessor 25 stores a program data in the memory 25*a* and executes this program in response to the power on detector 30. In step s1*a* the microprocessor 25 reads timing data stored in the memory 25*a*. In step s2, the microprocessor 25 sets the timing data to the timer 25*b*. In step s3, the microprocessor 25 checks whether or not the transmission stop timing has come by checking the timer. When the transmission stop timing has come, the microprocessor 25 detects the control output signal from the frequency discrimination circuit 24. If the microprocessor 25 has received the control output signal, the microprocessor 25 executes the switching operation in step s7 as mentioned above. Then, the microprocessor 25 holds this condition to enter the normal transmission mode in step s8.

In step s5, if the microprocessor 25 has not received the control output signal, the microprocessor 25 checks at step s6 whether or not a predetermined interval (T1–T2, or T3–T4) has passed. If the predetermined interval has not passed, processing returns to step s4 to detects the control output signal again. If the predetermined interval has passed, processing returns to s1*a* to detect the control output signal at the next transmission stop interval.

If both apparatus A and B enter the transmission stop condition at the same time, both apparatus A and B cannot change the frequency mode and cannot enter the normal transmission condition. However, this operation is repeated in both apparatus A and B and each of the microprocessors 25 stores a different timing data (a possibility of the same timing data is low) in the memory 25*a* to generate the transmission control signals at a different timing. Therefore, this operation can be executed during the next transmission stop interval.

In the above-mentioned embodiment, this invention is applied to a use for transmitting a video signal and a sound signal. However, this invention is also applicable to a general data transmission system for transmitting general digital data. In this embodiment, respective apparatus stores different timing data. However, if there is no possibility that both apparatus are turned on at the same time, both apparatus can store the same timing data.

A modification will be described.

In the above-mentioned embodiment, there is a possibility that both apparatus A and B enter the transmission stop interval at the same time and repeat this condition because there is a possibility that both timing data having a limited value may be equal each other among a lot of apparatus. Moreover, it is an additional processing to store different timing data in respective apparatus.

In this condition, if both apparatus A and B have the same timing data and enter the transmission stop interval at the same time, the following modification avoids repeatedly entering the transmission stop condition synchronously. In this modification, the microprocessor 25 generates a random number as the timing data. FIG. 7B is a diagram of a step of this modification. In this modification, the microprocessor 25 executes steps s1*b* and s1*c* instead of the step s1*a*, and other operations in FIG. 7A are the same.

The microprocessor 25 generates a random number data as the timing data in step s1*b*. The microprocessor 25 calculates the timing data by adding a constant value data to the random number data in step s1*c*. In the following step s2, the microprocessor 25 sets the timing data to the timer as mentioned above. Because the random data is generated to have eight bits, there are 256 possible numbers.

Figure 4:
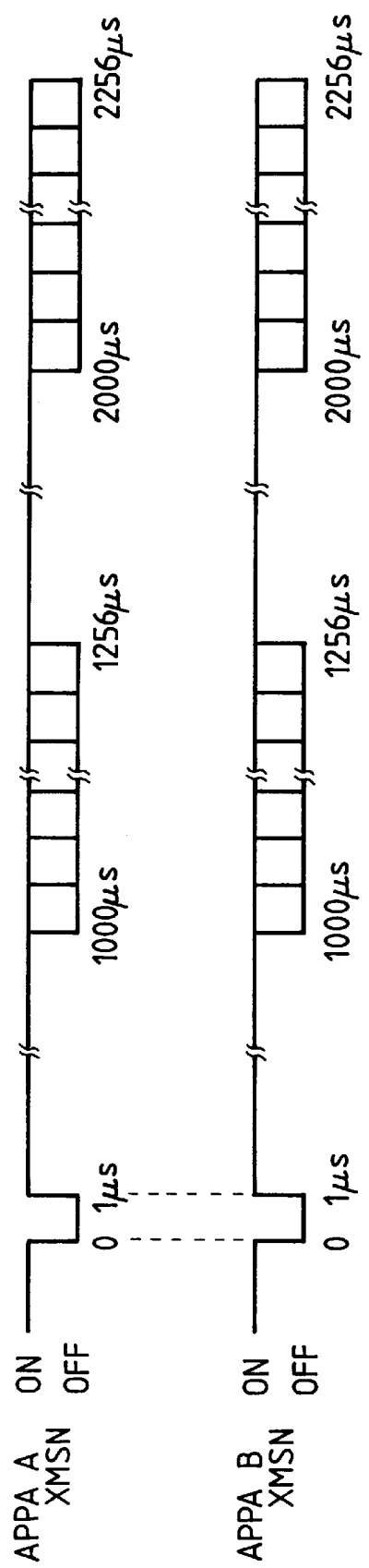
FIG. 4 is a diagram of a timing chart of a modification.
Figure 5:
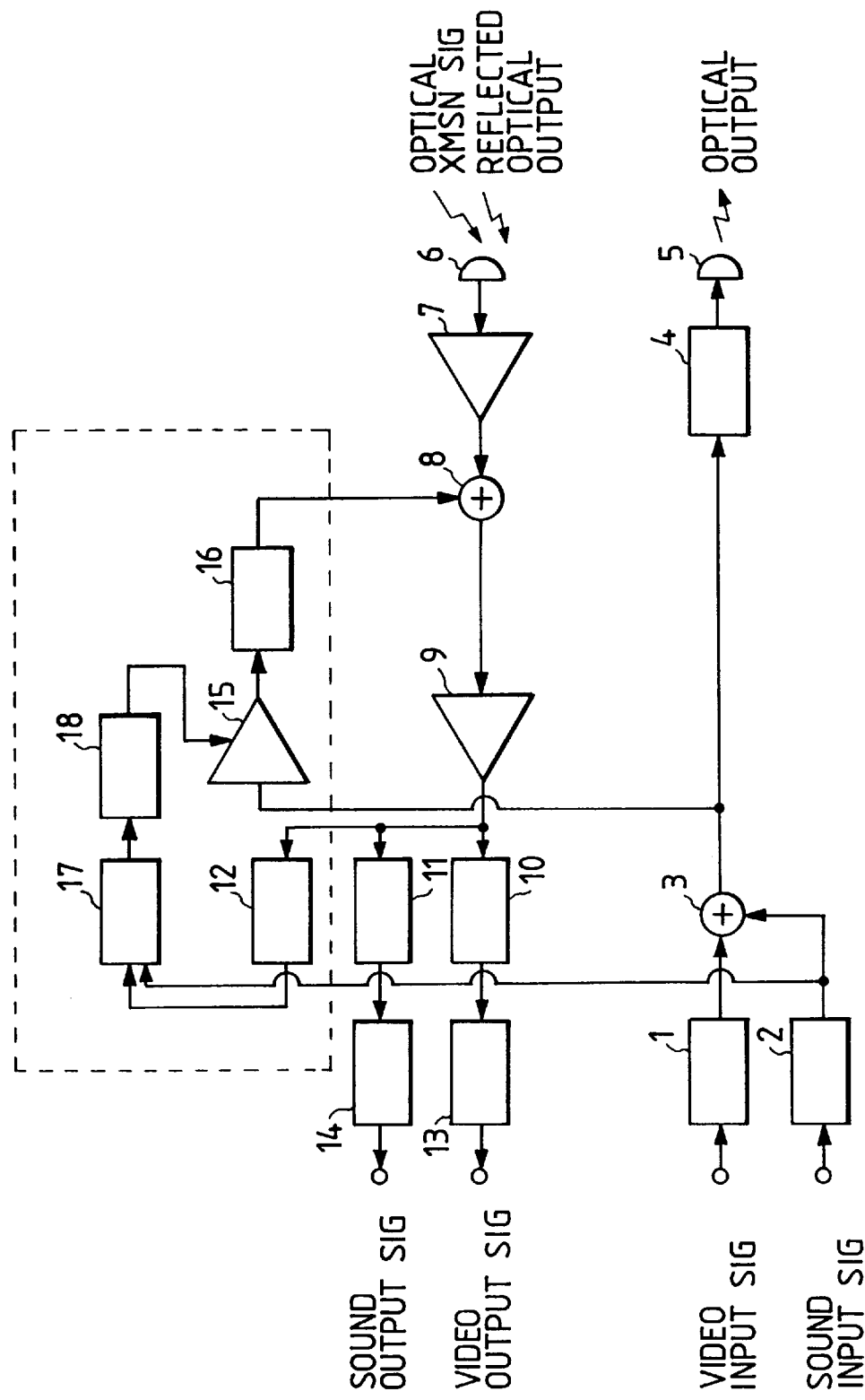
FIG. 5 is a block diagram of this prior art bi-directional optical communication apparatus.

FIG. 4 is a diagram of a timing chart of this modification.

If the transmission stop period of 1 $\mu$s occurs in both apparatus at the same time, each of apparatus A and B generates a random number which is selected from values of 1 to 256 and the microprocessor 25 calculates the timing data by adding 1000 to the random number. That is, the transmission stop period occurs at a timing of (1000+the random number) after the previous transmission stop period. Therefore, the possibility that both apparatus A and B enter the next transmission stop period at the same time is 1/256. When both apparatus A and B enter the next transmission stop period at the same time again, similarly the transmission timing is randomly set. Therefore, the possibility that both apparatus enter the transmission stop periods N times is $(1/256)^{N-1}$. Thus, the possibility is very low, so that the frequency setting operation can be provided rapidly.

What is claimed is:

1. A bi-directional optical wireless communication apparatus comprising:

modulation means for modulating an input signal and outputting a modulated signal having a center frequency selected from N different center frequencies, N being a natural number more than one;

optical transmission means responsive to said modulated signal for transmitting an optical signal;

optical receiving means for receiving N optical transmission signals having said N different center frequencies;

N receiving circuits responsive to said optical receiving means for selectively receiving said N optical transmission signals from said optical receiving means respectively;

comparator means for executing phase comparison between said modulated signal and said N optical transmission signals and for obtaining a cancellation signal;

means for combining said cancellation signal with said N optical transmission signals to reduce said optical signal reflected by a reflective object;

frequency discriminating means responsive to said optical receiving means for discriminating each frequency of at least one of received N transmission signals when said optical transmission means does not transmit said optical signal;

power on detection means for detecting a power on of said apparatus; first control means for controlling said optical transmission means to stop transmitting said optical signal for a predetermined interval at a predetermined timing from said detected power on and for controlling said frequency discriminating circuit to discriminate said frequency of one of received N transmission signals for said predetermined interval;

second control means for selecting at least one of said N receiving circuits which corresponds to said discriminated each frequency to supply an output signal from said selected at least one of said N receiving circuits and for operating said modulation means to select said one of said N different center frequencies other than said discriminated frequency to continuously transmit said optical signal.

2. A bi-directional optical wireless communication apparatus as claimed in claim 1, wherein said first control means controls said optical transmission means to stop transmitting said optical signal repeatedly with a repetition interval, said apparatus further comprising third control means for making said repetition interval random every repetition.

3. A bi-directional optical wireless communication apparatus as claimed in claim 1, further comprising a band pass filter circuit for selectively supplying said received N transmission signals from said optical receiving means to said frequency discriminating circuit.

4. A method of bi-directional optical wireless communication comprising the steps of:

providing a modulation circuit for modulating an input signal to a modulated signal having a center frequency which is selected from N different center frequencies, N being a natural number more than one;

providing an optical transmitter for transmitting an optical signal from said modulated signal;

providing an optical receiver for receiving N optical transmission signals having said N different center frequencies, said N optical transmission signals including said optical signal reflected by a reflective object;

providing N receiving circuits responsive to said optical receiver for selectively receiving said N transmission signals respectively;

providing a comparator for executing phase comparison between said modulated signal and said N optical transmission signals and for obtaining a cancellation signal;

providing a combining circuit for combining said cancellation signal with said N optical transmission signals to reduce said optical signal reflected by a reflective object;

providing a frequency discriminating circuit responsive to said optical receiver for discriminating each frequency of at least one of received N transmission signals;

detecting a power on;

controlling said optical transmitter to stop transmitting said optical signal for a predetermined interval at a predetermined timing from said detected power on;

controlling said frequency discriminating circuit to discriminate said each frequency for said predetermined interval; and effecting a continuous communication by:

selecting one of said N receiving circuits which corresponds to said discriminated each frequency to supply at least an output signal from said selected one of said N receiving circuits; and operating said modulation circuit to select said one of said N different center frequencies which is different from said discriminated frequency.

5. A method as claimed in claim 4 further comprising the steps of:

controlling said optical transmission means to stop transmitting said optical signal for said predetermined interval repeatedly with a repetition interval; and controlling said repetition interval to be random.

6. A bi-directional optical wireless communication apparatus comprising:

modulation means for modulating an input signal and outputting a modulated signal having a center frequency selected from N different center frequencies, N being a natural number more than one;

optical transmission means responsive to said modulated signal for transmitting an optical signal;

optical receiving means for receiving N optical transmission signals having said N different center frequencies;

N receiving circuits responsive to said optical receiving means for selectively receiving said N optical transmission signals from said optical receiving means respectively, each of said N receiving circuits including a band pass filter having a different pass band center frequency and a modulation circuit;

comparator means for executing phase comparison between said modulated signal and said N optical transmission signals and for obtaining a cancellation signal;

means for combining said cancellation signal with said N optical transmission signals to reduce said optical signal reflected by a reflective object;

frequency discriminating means responsive to said optical receiving means for discriminating each frequency of at least one of received N transmission signals when said optical transmission means does not transmit said optical signal;

first control means for controlling said optical transmission means to stop transmitting said optical signal for a predetermined interval at a predetermined timing from said detected power on and for controlling said frequency discriminating circuit to discriminate said frequency of one of received N transmission signals for said predetermined interval;

second control means for selecting one of said N receiving circuits which includes said band pass filter a pass band center frequency of which corresponds to said discriminated each frequency to supply an output signal from said selected one of said N receiving circuits and for operating said modulation means to select said one of said N different center frequencies other than said discriminated frequency to continuously transmit said optical signal.

7. The bi-directional optical wireless communication apparatus as claimed in claim 6, wherein:

said N different center frequencies include first and second frequencies;

said first frequency is different from said second frequency;

said N receiving circuits include first and second receiving circuit;

said first receiving circuits includes a first band pass filter having a first pass band center frequency and a first modulation circuit supplied with an output of said first band pass filter, and said second receiving circuit includes a second band pass filter having a second pass band center frequency and a second modulation circuit supplied with an output of said second band pass filter, and wherein:

when said discriminated each frequency corresponds to said first frequency, said second control means selects said first receiving circuit to output said modulated signal having said first frequency which is supplied to said comparator means and operates said modulation means to select said second center frequency; and when said discriminated each frequency corresponds to said second frequency, said second control means selects said second receiving circuit to output said modulated signal having said second frequency which is supplied to said comparator means and operates said modulation means to select said first center frequency.

8. A bi-directional optical wireless communication apparatus as claimed in claim 6, wherein said second control means controls said optical transmission means to stop transmitting said optical signal repeatedly with a repetition interval, said apparatus further comprising third control means for making said repetition interval random every repetition.

* * * * *